(12) United States Patent
Galbreath, Jr. et al.

(10) Patent No.: US 6,416,127 B1
(45) Date of Patent: Jul. 9, 2002

(54) OSCILLATING DAMPED ENERGY MANAGEMENT DEVICE

(75) Inventors: Ashford A. Galbreath, Jr., Lawrence, KS (US); Dianna Sabo, Milford, MI (US); John R. Sims, Dearborn, MI (US); Stephen Lambrecht, New Hudson, MI (US); Joel P. Mendel, Bloomfield Hills, MI (US); Steve Schulte, Novi, MI (US); Greg Fraley, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/697,549

(22) Filed: Oct. 26, 2000

(51) Int. Cl.[7] .............................. B60N 2/42; B60R 21/13
(52) U.S. Cl. ........................... 297/216.13; 297/216.14; 297/216.15; 297/216.16
(58) Field of Search ..................... 297/216.13, 216.14, 297/216.15, 216.16

(56) References Cited

U.S. PATENT DOCUMENTS

| | | | |
|---|---|---|---|
| 4,474,347 A | 10/1984 | Hazelsky | |
| 5,290,089 A | 3/1994 | Oleszko et al. | 297/216.14 |
| 5,295,729 A | 3/1994 | Viano | 297/216.14 |
| 5,454,622 A | 10/1995 | Demopoulos | 297/216.14 |
| 5,671,964 A * | 9/1997 | DeRees et al. | 297/344.15 X |
| 5,676,421 A | 10/1997 | Brodsky | 297/216.13 |
| 5,722,722 A * | 3/1998 | Massara | 297/216.13 |
| 5,746,467 A * | 5/1998 | Jesadanont | 297/216.13 X |
| 5,772,280 A * | 6/1998 | Massara | 297/216.13 X |
| 5,826,937 A | 10/1998 | Massara | |
| 5,836,647 A | 11/1998 | Turman | 297/216.14 |
| 5,855,411 A | 1/1999 | Inoue | 297/216.19 |
| 6,033,017 A * | 3/2000 | Elqadah et al. | 297/216.13 X |
| 6,076,887 A * | 6/2000 | Andersson | 297/216.13 X |
| 6,250,705 B1 * | 6/2001 | Zuch | 297/216.16 X |
| 6,312,049 B1 * | 11/2001 | Sullivan et al. | 297/216.14 X |

* cited by examiner

Primary Examiner—Peter M. Cuomo
Assistant Examiner—Rodney B. White
(74) Attorney, Agent, or Firm—MacMillan, Sobanski & Todd, LLC (57) ABSTRACT

A vehicle seat includes a seat bottom, a seat back pivotally connected with respect to the seat bottom, a seat track and an oscillating damped energy management device secured between the seat back and the seat bottom. The device includes a damper mechanism having a gear assembly coupled to a damper crank on a secondary gear shaft. Rotation of the damper crank causes an oscillating movement of a damper rod coupled to a damper cylinder. The viscosity of the fluid within the damper cylinder can be selected to vary the energy dampening characteristics of the damper mechanism. The damper mechanism may also include a pair of damper cylinders that can oscillate approximately ninety degrees out of phase with respect to each other to more smoothly control the damped energy during low and high impacts.

19 Claims, 8 Drawing Sheets

OSCILLATING DAMPED ENERGY MANAGEMENT DEVICE

BACKGROUND OF THE INVENTION

This invention relates in general to an energy management device adapted for attachment between a seat back and a seat track for dissipating energy of the seat back with respect to the lower seat frame in forward and rearward impacts in a vehicle seat assembly.

In an accident condition, large impact forces may be delivered to the occupant of the seat in both a rearward or frontal impact. In a rearward impact, the occupant is forced against the seat, and may experience a large energy pulse. Similarly, in a forward impact, in vehicle seats which incorporate the belt restraint system directly into the seat back, the occupant will engage the restraint system, and therefore may receive a large energy pulse from the seat which supports this restraint system.

To absorb the energy during a large energy pulse, several absorption assemblies have been developed. For example, commonly-assigned U.S. Pat. No. 5,722,722 to Massara discloses a vehicle seat energy absorber including a recliner/damper assembly which dampens energy of the seat back as it pivots with respect to the seat track in a high energy impact. The damper mechanism comprises a bi-directional damper that provides a different damping behavior in the forward and rearward directions. The recliner mechanism includes a clevis pin that is explosively released in a high energy impact to selectively disengage the recliner mechanism from the damper mechanism to allow the damper mechanism to dissipate energy of the seat back as it pivots with respect to the seat track.

In another example, commonly-assigned U.S. Pat. No. 5,826,937 to Massara discloses an energy absorbing seat assembly that includes a head restraint system incorporating a damper mechanism positioned between the upper end of the seat back and the heat restraint for energy management in a high energy impact. The damper mechanism is configured to dissipate head restraint energy in a rearward impact to cushion the load transfer between the occupant and the head restraint.

However, the above-mentioned damper mechanisms dissipate the energy pulse during impact by using a half-stroke of the damper, rather than in a reciprocating or oscillating stroke of the damper to provide increased management the energy dissipated by the damper. Further, the above-mentioned damper mechanism effectively dissipates energy only for only one impact event having a large energy pulse, rather than for a wide range of impact events having large and small energy pulses. Thus, it is desirable to provide a damped energy management device that can effectively dampen the energy pulse by using a reciprocating or oscillating stroke for a wide range of impact events having large and small energy pulses.

SUMMARY OF THE INVENTION

This invention relates to a vehicle seat assembly comprising a seat track, a seat back pivotally connected with respect to the seat track, and an oscillating damped energy management device secured between the seat back and the seat track. The device comprises a recliner arm secured to the seat back, a gear shaft operatively coupled to the recliner arm, a first damper crank mounted on the gear shaft, a first damper cylinder operatively coupled to the first damper crank by a first damper rod. The rotational movement of the first damper crank causes an oscillating movement of the first damper rod, thereby causing the first damper cylinder to dissipate energy during forward and rearward impacts of the vehicle seat assembly.

In another aspect of the invention, an oscillating damped energy management device is secured between a seat back and a seat track of a vehicle seat assembly. The device comprises a first damper crank mounted on a gear shaft, the gear shaft being coupled to the seat back of the vehicle seat assembly, a first damper cylinder, and a first damper rod coupling the first damper cylinder and the first damper crank. The rotational movement of the first damper crank causes an oscillating movement of the first damper rod, thereby causing the first damper cylinder to dissipate energy during forward and rearward impacts of the vehicle seat assembly.

In a method of dissipating energy during forward and rearward impacts of a vehicle seat assembly by using an oscillating damped energy management device secured between a seat back and a seat track of the vehicle seat assembly, the method comprises the steps of:

a) mounting a first damper mounted on a gear shaft, the gear shaft being coupled to the seat back of the vehicle seat assembly;

b) providing a first damper cylinder; and c) coupling the first damper cylinder to the first damper crank by a first damper rod, whereby a rotational movement of the first damper crank causes an oscillating movement of the first damper rod, thereby causing the first damper cylinder to dissipate energy during forward and rearward impacts of the vehicle seat assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
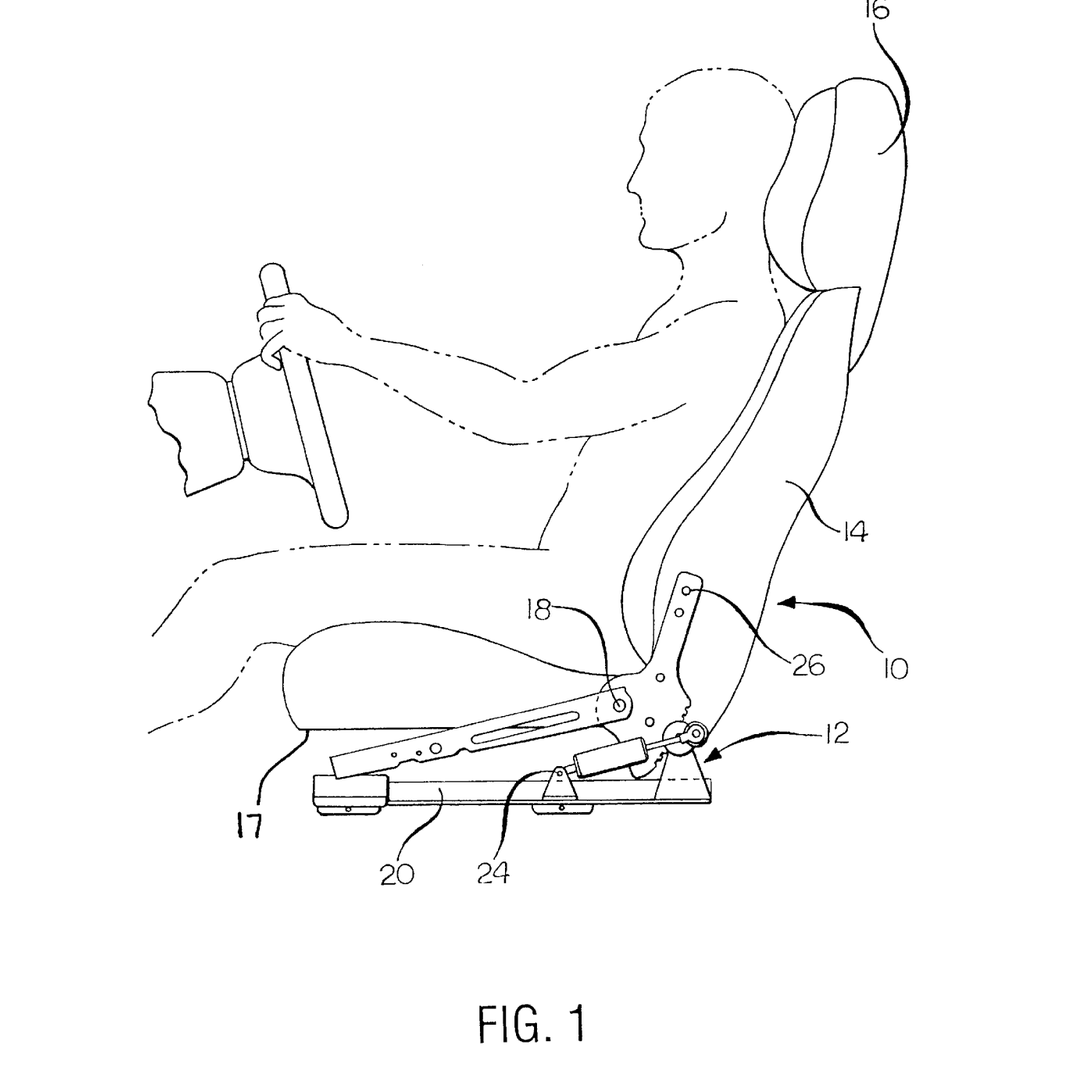
FIG. 1 shows a side view of a vehicle seat assembly incorporating an oscillating damped energy management device in accordance with the invention.

Referring now to the drawings, there is illustrated in FIG. 1 a vehicle seat assembly, shown generally at 10, incorporating an oscillating damped energy management device 12 in accordance with the invention. The seat assembly 10 includes a seat back 14 having a head rest 16 mounted thereto. The seat back 14 is pivotally connected to a seat bottom 17 at a pivot joint 18 to the track or lower seat frame member 20.

The oscillating damped energy device 12 includes a lower structural attachment point 24 which is pivotally secured to the seat track 20, and an upper structural attachment point 26 which is pivotally secured to the seat back 14. In this configuration, the device 12 allows the smooth adjustment of the angle of the seat back 14 with respect to the seat track 20. Alternatively, the device 12 can be directly connected between the seat back 14 and the seat bottom 17.

Referring now to FIGS. 2–5, the oscillating damped energy device 12 includes a recliner arm 28 secured to the seat back 14, a gear shaft 30 operatively coupled to the recliner arm 28, one or more damper cranks 32 mounted on the gear shaft 30, one or more damper cylinders 34 operatively coupled to the damper cranks 32 by a damper rod 36. For illustrative purposes only, a pair of damper cranks 32 are mounted on the gear shaft 30, and a pair of damper cylinders 34 are operatively coupled to the damper cranks 32 by the damper rod 36.

Preferably, the gear shaft 30 is rotatably mounted on a bearing block 42. Similarly, the pair of damper cylinders 34 is pivotally mounted to an angle bracket 44. The bearing block 42 and the angle brackets 44 can be secured to the structure (not shown), such as the floor board of the vehicle. It should be appreciated that the invention is not limited by the number of damper cranks and damper cylinders, and that the invention can be practiced with any appropriate number of damper cranks and damper cylinders.

Figure 2:
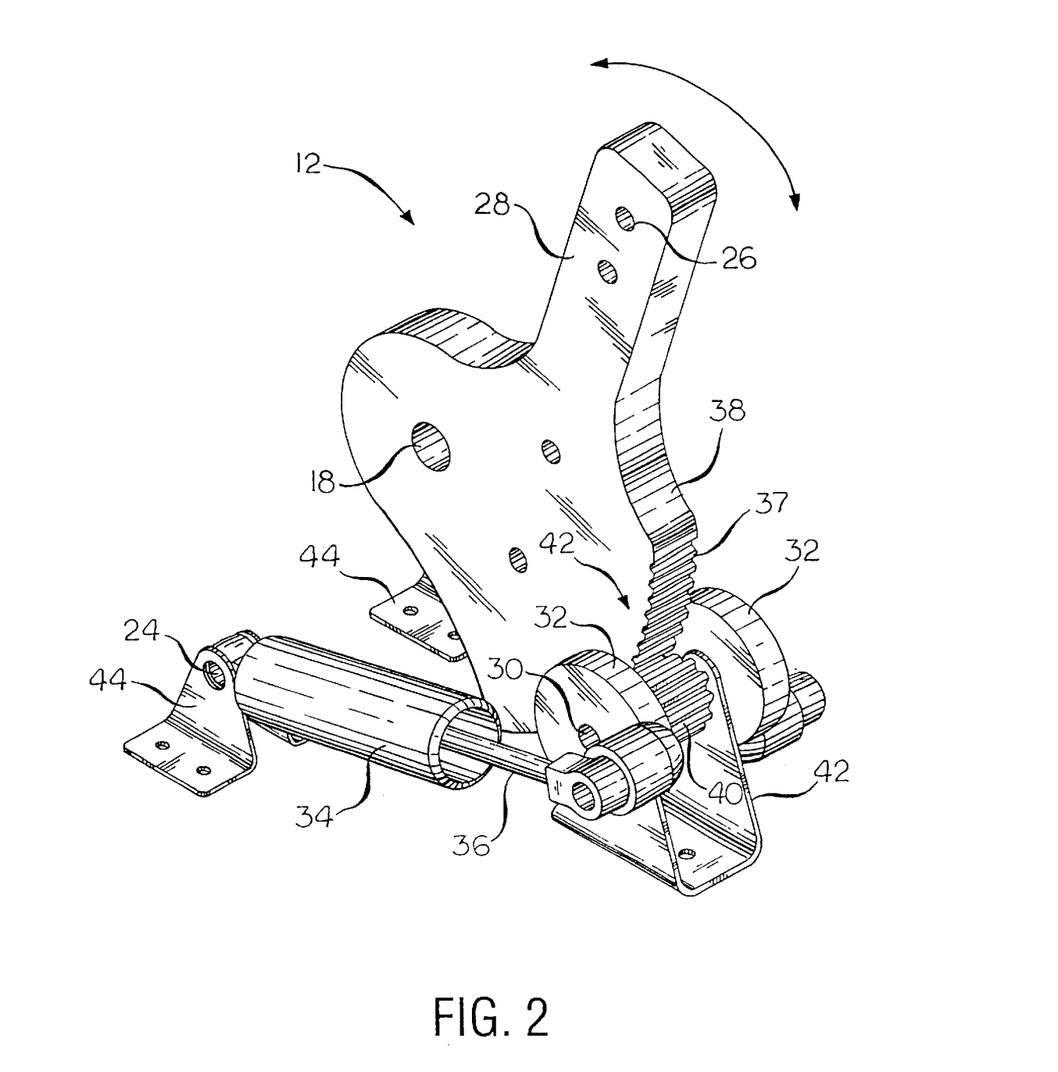
FIG. 2 shows a side perspective view of the oscillating damped energy management device in accordance with a first embodiment of the invention.
Figure 3:
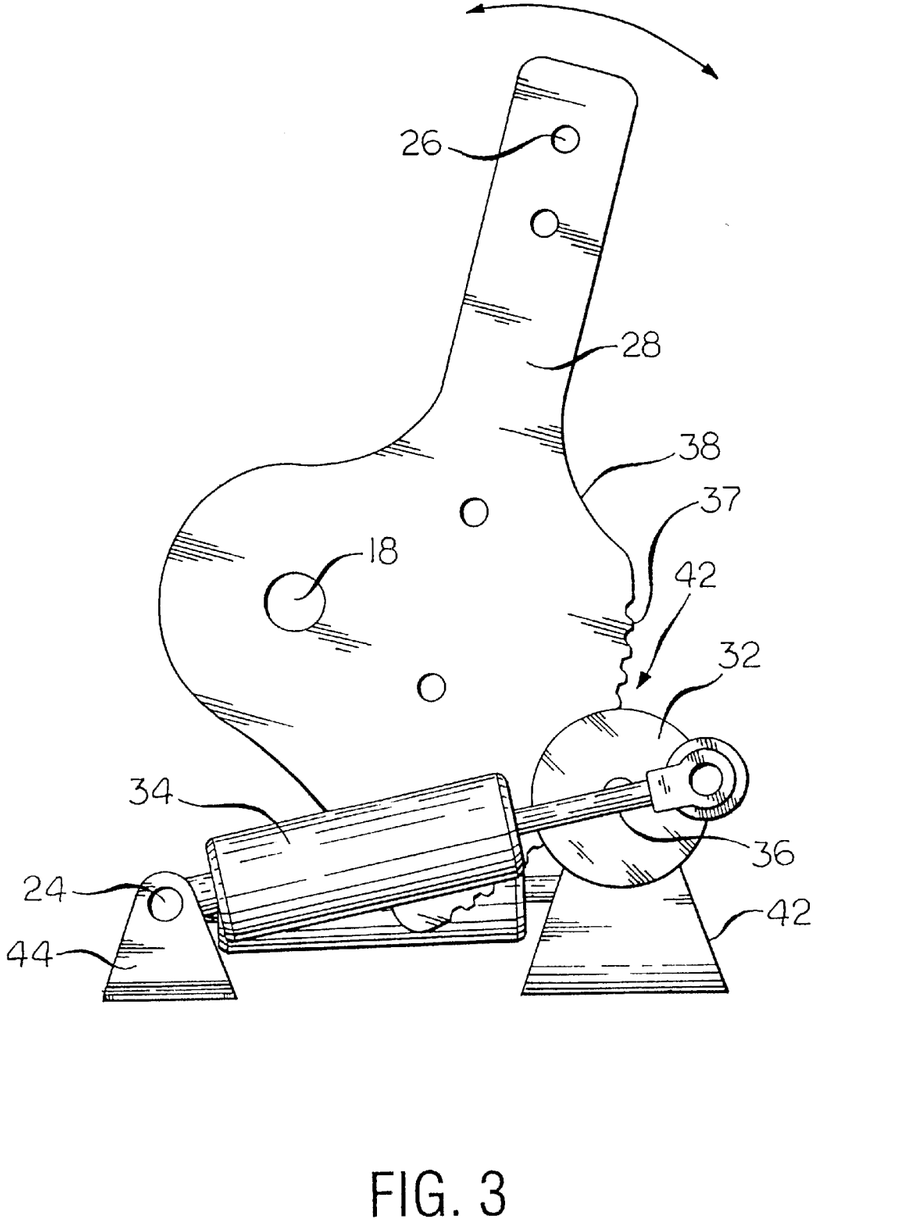
FIG. 3 shows a side view of the oscillating damped energy management device of FIG. 2.
Figure 4:
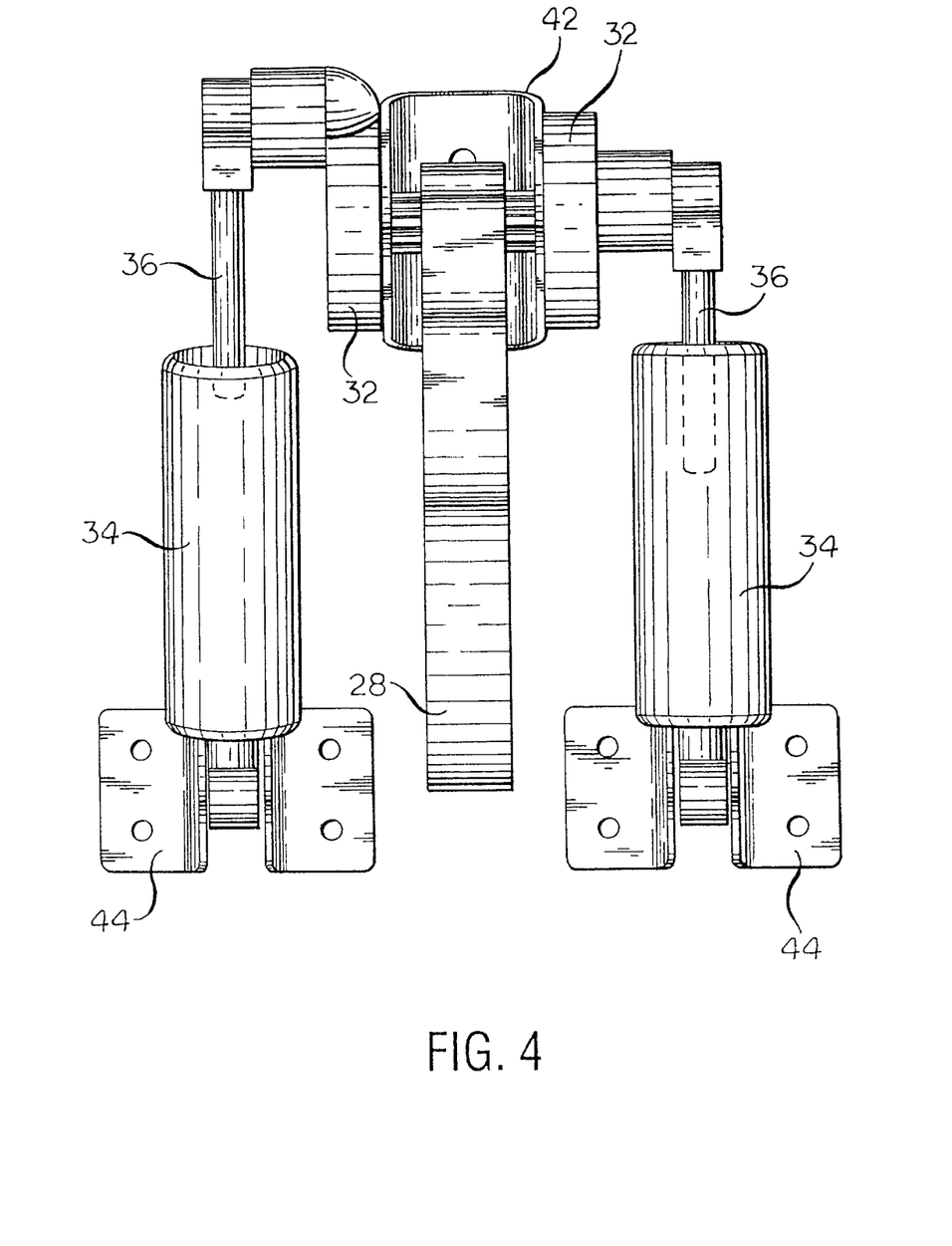
FIG. 4 shows a top view of the oscillating damped energy management device FIG. 2.
Figure 5:
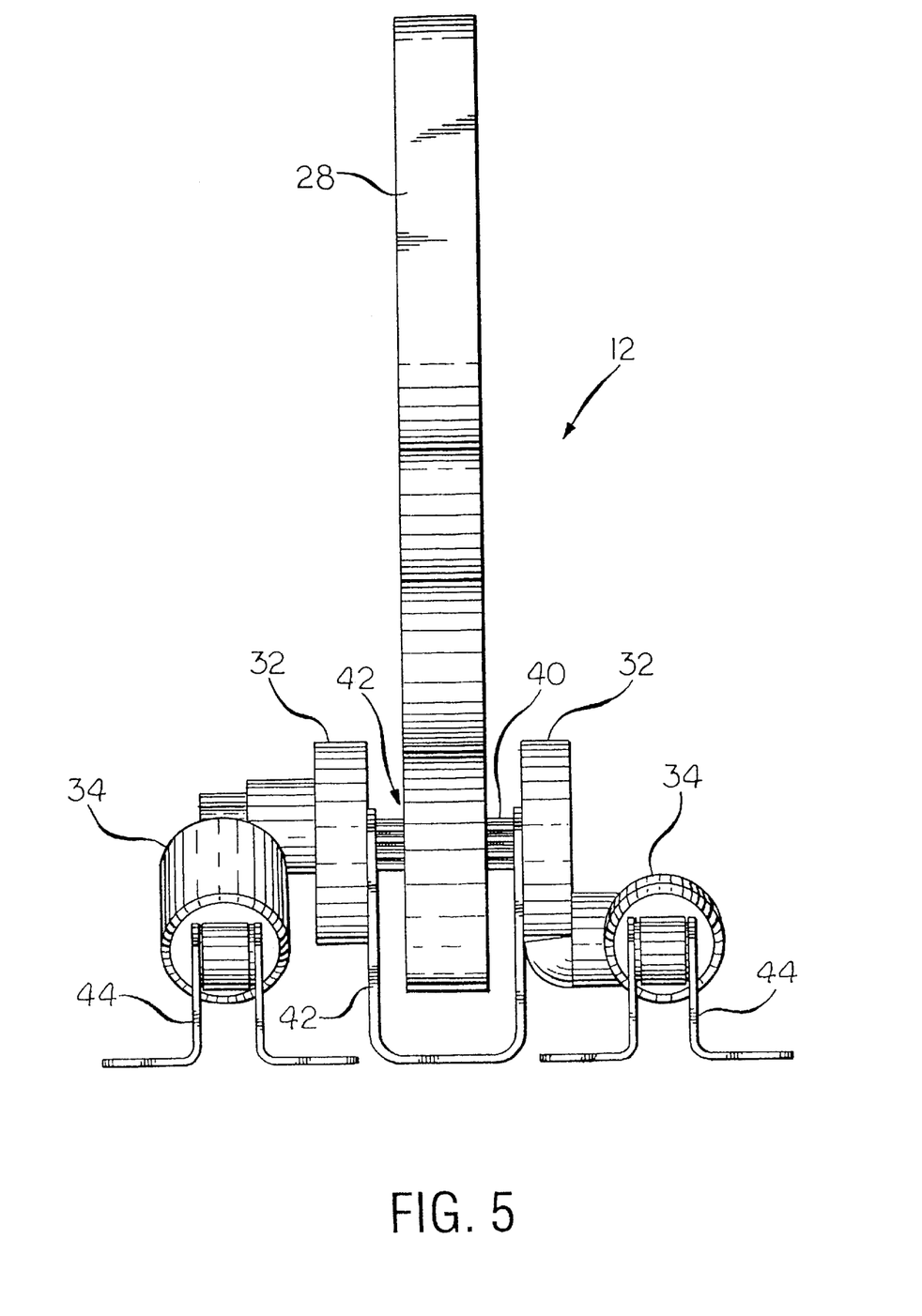
FIG. 5 shows a front view of the oscillating damped energy management device of FIG. 2

In the first embodiment of the invention, the recliner arm 28 includes a plurality of teeth 37 on an outer cam surface 38 that can mate with a plurality of teeth 40 on the gear shaft 30 to form a spur gear arrangement 42, as best shown in FIG. 2. As the seat back 14 pivots about the upper structural attachment point 26 of the recliner arm 28 during forward and rearward impacts of the vehicle seat assembly 10, the forward and/or rearward linear pivoting movement of the recliner arm 28 causes a rotational movement of the gear shaft 30. The rotational movement of the gear shaft 30 causes a circular or rotational movement of the damper cranks 32, which in turn causes a linear oscillating or reciprocating movement of the damper rods 36, thereby causing the damper cylinders 34 to dissipate energy during the forward and/or rearward impact of the vehicle seat assembly 10.

For a maximum load, DF, on the device 12 of about 2000 newton, and a stroke radius of about 25 mm (or a diameter of about 50 mm), the angular displacement of the damper cranks 32 as a function of time, Dang(t), can be expressed as:

$$Dang(t) = Angamp \cdot AngH(t)$$

where,

Angamp=the gear ratio amplification of the system, and
AngH(t)=the angular displacement of the back frame.

For a two damper crank system, the change in length of each damper crank 32 can be expressed as:

$$Ld1(t) = ((L_p - Str \cdot \cos(Dang(t)))^2 + (Str \cdot \sin(Dang(t)))^2)^{0.5}$$

$$Ld2(t) = ((L_p - Str \cdot \cos(Dang(t)+90deg))^2 + (Str \cdot \sin(Dang(t)+90deg))^2)^{0.5}$$

where,

Ld1=the length of damper 1 over time, and
Ld2=the length of damper 2 over time.

The velocity, Vd(t), of the stroke for each damper crank 32 can be expressed as:

$$Vd(t) = \left| \frac{\frac{d}{dt} Ld(t)}{\sec} \right|$$

The force transmission angle of each damper crank 32, TrangI(t), can be expressed as:

$$TrangI(t) = \frac{a\sin\left(\frac{\sin(Dang(t)) \cdot Str}{Ld(t)}\right)}{\deg} \quad \text{where,}$$

$$DangX(t) = \frac{a\sin(\sin(Dang(t)))}{\deg}$$

Substitution yields:

$$Trang(t) = TrangI(t) + DangX(t) - \pi$$

The high end force transmission of each damper crank 32 can be expressed as:

$$DfH1(t) = (DFH1(t)) \cdot |\sin(Trang(t) \cdot \deg)|Dn$$

$$DfH2(t) = (DFH2(t)) \cdot |\sin(Trang(t) \cdot \deg + 90 \deg))|Dn$$

where,

DfH1(t)=the high end force of damper 1,
DfH2(t)=the high end force of damper 2, and
Dn=a constant.

Similarly, the low end force transmission of each damper crank 32 can be expressed as:

$$DfL1(t) = (DFL1(t)) \cdot |\sin(Trang(t) \cdot \deg)|Dn$$

$$DfL2(t) = (DFL2(t)) \cdot |\sin(Trang(t) \cdot \deg + 90 \deg))|Dn$$

where,

DfL1(t)=the low end force of damper 1,
DfL2(t)=the low end force of damper 2.

The total high force transmission can be expressed as the summation of the high force transmissions from each damper crank 32. In other words, $$DFRH(t) = DfH1(t) + DfH2(t)$$

Likewise, the total low force transmission can be expressed as:

$$DFRL(t) = DfL1(t) + DfL2(t)$$

Figure 6:
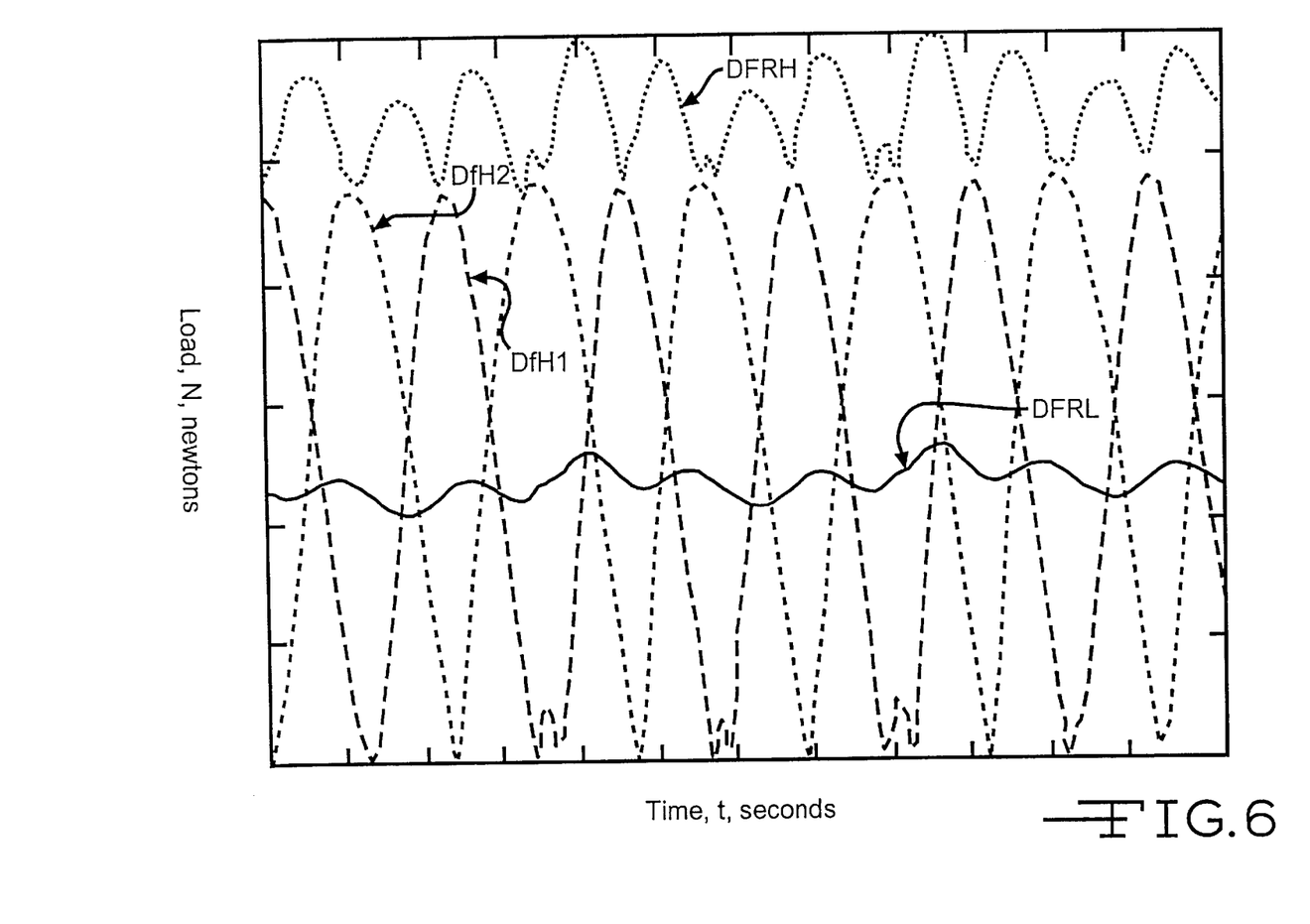
FIG. 6. shows a diagram of the load on each damper crank as a function of time, and the load on both damper cranks as the summation of the load on each damper crank.

Using the above equations for the force transmission, the load on the damper cranks 32 of the device 12 is illustrated in FIG. 6. As can be seen, the summation of the load from both damper cranks 32, DFRH(t), varies much less than the load from each damper crank, DfH1 and DfH2 because the piston rods 36 are connected to the damper cranks 32 at an offset of about ninety-degrees with respect to each other, as best seen in FIG. 2. For example, if one of the piston rods 36 is connected to one of the damper cranks 32 at approximately zero-degrees (twelve o'clock) with respect to the vertical axis of the device 12, the other one of the piston rods 36 is connected to the other one of the damper cranks 32 at approximately ninety-degrees (three o'clock) with respect to the vertical axis of the device 12. As a result, one of the piston rods 36 is fully inserted into its associated damper cylinder 34 while the other one of the piston rods 36 is fully withdrawn from its associated damper cylinder 34 as the damper cranks 32 rotate. As the pivotal movement of the recliner arm 28 causes further rotational movement of the damper cranks 32, the opposite damper rod 36 will be fully inserted into its associated damper cylinder 34 while the other damper rod 36 will be fully withdrawn from its associated damper cylinder 34 to complete one insertion cycle of each damper rod 36. It should be realized that there are two complete insertion cycles for each damper rod 36 for one full revolution (360 degrees) of its associated damper crank 32. This relatively rapid oscillation of each damper rod 36 during the rotation of its associated damper crank 32 "smoothes" out the variation of the load from the summation from both damper cranks 32, as shown in FIG. 6.

Figure 7:
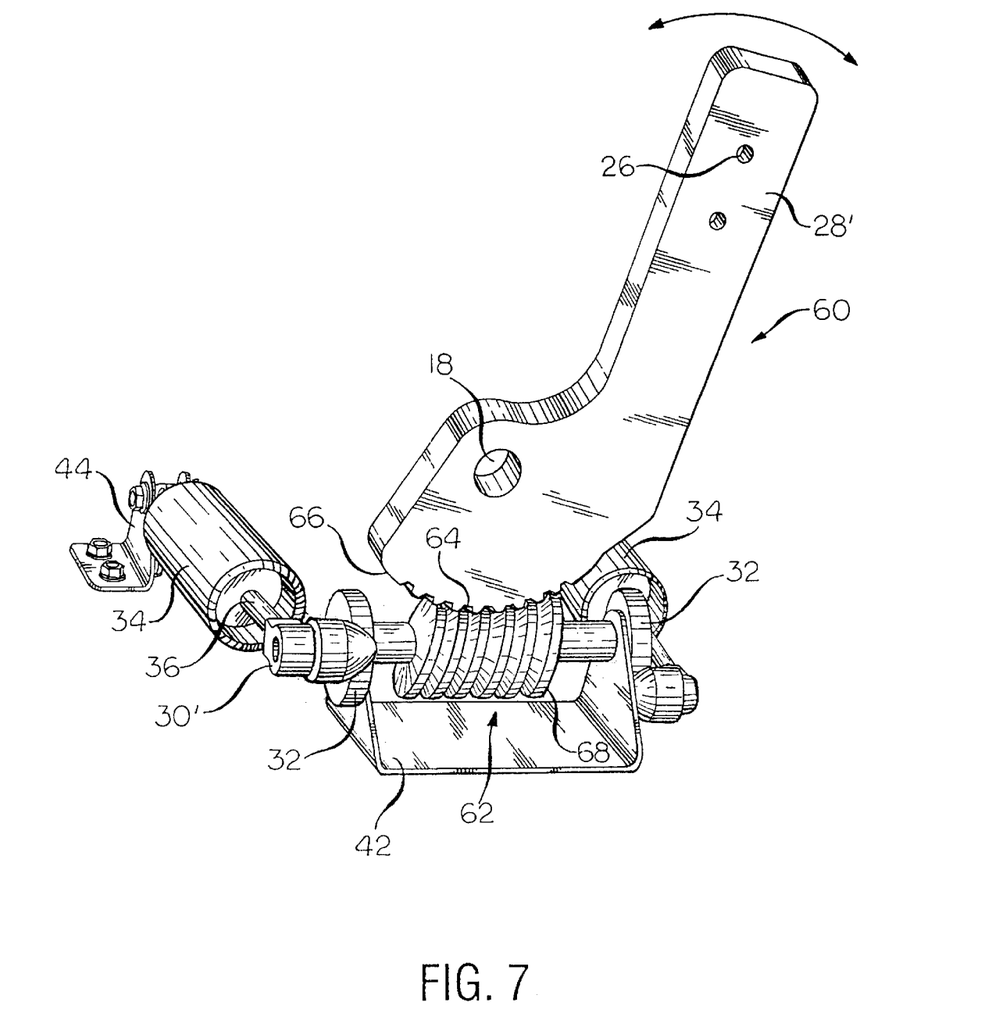
FIG. 7 shows a side perspective view of the oscillating damped energy management vice in accordance with a second embodiment of the invention.
Figure 8:
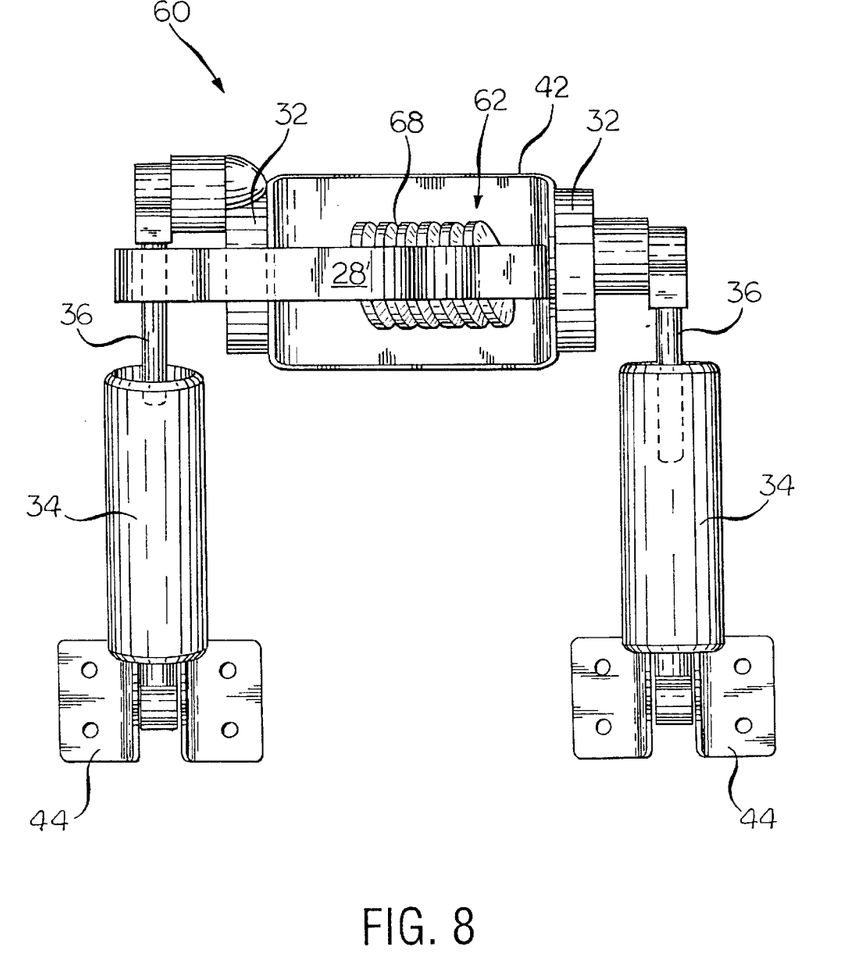
FIG. 8 shows a side view of the oscillating damped energy management device of FIG. 7.

FIGS. 7 and 8 illustrate an oscillating damped energy management device 60 according to a second embodiment of the invention. In this embodiment, the device 60 uses a worm gear arrangement, shown generally at 62, rather than the spur gear arrangement 42 of the first embodiment of the invention. The worm gear arrangement 62 is formed by a plurality of teeth 64 on an outer cam surface 66 of the recliner arm 28' that can mate with the plurality of teeth 68 on the gear shaft 30', as shown in FIG. 6. Similar to the first embodiment, the forward and/or rearward linear pivoting movement of the recliner arm 28' causes a rotational movement of the gear shaft 30'. The rotational movement of the gear shaft 30' causes a circular or rotational movement of the damper cranks 32, which in turn causes a linear oscillating or reciprocating movement of the damper rods 36, thereby causing the damper cylinders 34 to dissipate energy during the forward and/or rearward impact of the vehicle seat assembly 10.

Unlike the first embodiment, the rotational movement of the gear shaft 30' is in a direction orthogonal to the linear pivoting movement of the recliner arm 28'. In addition, the orientation of the damper cranks 32 are also orthogonal to the linear pivoting movement of the recliner arm 28', unlike the first embodiment. Thus, the damper cranks 32 are oriented orthogonal to the seat track 20 when mounted to the vehicle seat assembly 10.

It will be appreciated that the invention can be practiced with any suitable gear arrangement, such as a helical gear arrangement, a bevel gear arrangement, a screw gear arrangement, and the like, that can translate the linear pivoting movement of the recliner arm 28, 28' into the oscillating movement of the damper rods 36, thereby causing the damper cylinders 34 to dissipate energy during the forward and/or rearward impact of the vehicle seat assembly 10.

Because the amount of energy dissipated by the device 12 can be selected by varying the viscosity of the fluid within the damper cranks 32, the device 12 can also be used for reclining the seat assembly 10 to select an angle of the seat back 14 with respect to the seat track 20.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat assembly, comprising:
   a seat bottom;
   a seat back pivotally connected with respect to the seat bottom; and
   a dampening device connected between the seat back and the seat bottom,
   wherein pivotal movement of the seat back as a result of forces acting on the seat back during a forward or rearward impact causes an oscillating movement of the dampening device.

2. The vehicle seat assembly according to claim 1 wherein the dampening device comprises a recliner arm secured to the seat back, a gear shaft operatively coupled to the recliner arm, a first damper crank mounted on the gear shaft, a first damper cylinder operatively coupled to the first damper crank by a first damper rod.

3. The vehicle seat assembly according to claim 2, wherein a rotational movement of the first damper crank as a result of pivotal movement of the seat back causes an oscillating movement of the first damper rod, thereby causing the first damper cylinder to dissipate energy during forward and rearward impacts of the vehicle seat assembly.

4. The vehicle seat assembly according to claim 2, wherein the first damper cylinder contains a fluid having a selectable viscosity for varying an amount of energy dissipated by the oscillating damped energy management device.

5. The vehicle seat assembly according to claim 2, further comprising a second damper cylinder operatively coupled to the second damper crank by a second damper rod, wherein a rotational movement of the second damper crank as a result of pivotal movement of the seat back causes an oscillating movement of the second damper rod, thereby causing the second damper cylinder to dissipate energy during forward and rearward impacts of the vehicle seat assembly.

6. The vehicle seat assembly according to claim 5, wherein the second damper rod is operatively coupled to the second damper cylinder such that the second damper rod oscillates the second damper cylinder approximately ninety degrees out of phase with respect to the first damper cylinder.

7. The vehicle seat assembly according to claim 1, further including a gear mechanism for operatively coupling the recliner arm to the gear shaft of the oscillating damped energy management device.

8. The vehicle seat assembly according to claim 7, wherein the gear mechanism comprises a spur gear arrangement.

9. The vehicle seat assembly according to claim 7, wherein the gear mechanism comprises a worm gear arrangement.

10. An oscillating damped energy management device secured between a seat back and a seat track of a vehicle seat assembly, the device comprising:
- a first damper crank mounted on a gear shaft, the gear shaft being coupled to the seat back of the vehicle seat assembly;
- a first damper cylinder; and
- a first damper rod coupling the first damper cylinder and the first damper crank,
- wherein a rotational movement of the first damper crank as a result of pivotal movement of the seat back causes an oscillating movement of the first damper rod, thereby causing the first damper cylinder to dissipate energy during forward and rearward impacts of the vehicle seat assembly.

11. The vehicle seat assembly according to claim 10, further including a gear mechanism for coupling the seat back to the gear shaft.

12. The vehicle seat assembly according to claim 11, wherein the gear mechanism comprises a spur gear arrangement.

13. The vehicle seat assembly according to claim 11, wherein the gear mechanism comprises a worm gear arrangement.

14. The vehicle seat assembly according to claim 10, wherein the first damper cylinder contains a fluid having a selectable viscosity for varying an amount of energy dissipated by the damper cylinder.

15. The vehicle seat assembly according to claim 10, further comprising a second damper crank mounted on the gear shaft, a second damper cylinder, and a second damper rod coupling the second damper cylinder to the second damper crank, wherein a rotational movement of the second damper crank as a result of pivotal movement of the seat back causes an oscillating movement of the second damper rod, thereby causing the second damper cylinder to dissipate energy during forward and rearward impacts of the vehicle seat assembly.

16. The vehicle seat assembly according to claim 15, wherein the second damper rod is operatively coupled to the second damper cylinder such that the second damper rod oscillates the second damper cylinder approximately ninety degrees out of phase with respect to the first damper cylinder.

17. A method of dissipating energy during forward and rearward impacts of a vehicle seat assembly by using an oscillating damped energy management device secured between a seat back and a seat bottom of the vehicle seat assembly, the method comprising the steps of:
- (a) providing a seat bottom;
- (b) pivotally connecting a seat back with respect to the seat bottom; and
- (c) connecting a dampening device between the seat back and the seat bottom,
- wherein pivotal movement of the seat back as a result of forces acting on the seat back during a forward or rearward impact causes an oscillating movement of the dampening device.

18. The method according to claim 16, further comprising the step of providing a gear mechanism to couple the dampening device to the seat back of the vehicle seat assembly.

19. The method according to claim 15, wherein the dampening device includes a first damper cylinder containing a fluid having a selectable viscosity for varying an amount of energy dissipated by the damper cylinder.

* * * * *